United States Patent
Kutsuna et al.

(10) Patent No.: US 7,267,877 B2
(45) Date of Patent: *Sep. 11, 2007

(54) COMPOSITION FOR COATING HAVING A GAS BARRIER PROPERTY, COATING AND COATED FILM HAVING A GAS BARRIER PROPERTY USED THE SAME

(75) Inventors: Takaaki Kutsuna, Hiratsuka (JP); Shuta Kihara, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/015,564

(22) Filed: Dec. 17, 2001

(65) Prior Publication Data

US 2002/0120063 A1    Aug. 29, 2002

(30) Foreign Application Priority Data

| Dec. 26, 2000 | (JP) | ............................... 2000-394205 |
| Apr. 3, 2001 | (JP) | ............................... 2001-104280 |
| Apr. 3, 2001 | (JP) | ............................... 2001-104281 |

(51) Int. Cl.
- *B32B 15/08* (2006.01)
- *B32B 27/08* (2006.01)
- *B32B 27/10* (2006.01)
- *B32B 27/38* (2006.01)
- *C08L 63/00* (2006.01)

(52) U.S. Cl. ...................... 428/414; 428/413; 428/416; 428/418; 525/423; 525/451

(58) Field of Classification Search ................ 428/413, 428/39.7, 414, 418; 525/425, 420, 423, 181; 525/408; 528/407, 422

See application file for complete search history.

(56) References Cited

U.S. PATENT DOCUMENTS

| 3,683,044 | A | * | 8/1972 | Huang et al. ................ 525/526 |
| 3,704,229 | A | | 11/1972 | Tashiro et al. ............... 252/182 |
| 4,541,958 | A | | 9/1985 | Miyamoto et al. ........ 260/404.5 |
| 4,542,070 | A | | 9/1985 | Ohtani et al. ................ 428/416 |
| 4,565,859 | A | * | 1/1986 | Murai et al. ................. 528/365 |
| 4,793,886 | A | * | 12/1988 | Okamura et al. ......... 156/307.3 |
| 4,957,980 | A | | 9/1990 | Kobayashi et al. .......... 525/425 |
| 5,356,961 | A | * | 10/1994 | Nishimura et al. .......... 523/414 |
| 5,728,439 | A | * | 3/1998 | Carlblom et al. ......... 428/36.91 |
| 5,746,935 | A | * | 5/1998 | Corley et al. ........... 252/182.23 |
| 5,840,825 | A | * | 11/1998 | Carlblom et al. ............ 528/183 |
| 6,861,147 | B2 | * | 3/2005 | Kutsuna et al. ............. 428/416 |
| 7,018,715 | B2 | * | 3/2006 | Kutsuna et al. ............. 428/416 |

FOREIGN PATENT DOCUMENTS

| EP | 0709418 | A2 | * | 5/1996 |
| GB | 2071111 | A | | 9/1981 |
| GB | 2112388 | A | | 7/1983 |
| JP | 63-301264 | | | 12/1988 |
| JP | 63-301264 | A | * | 12/1988 |
| JP | 06-329952 | | | 5/1993 |
| JP | 7-91367 | | | 10/1995 |
| JP | 7-91368 | | | 10/1995 |
| JP | 8-104738 | A | * | 4/1996 |
| JP | 9-316422 | | | 12/1997 |

OTHER PUBLICATIONS

Abstract, JP 61012723, Horie et al., Jan. 21, 1986.*
English Translation of JP 08-104738 obtained from JPO website. Apr. 1996.*
CAPLUS accession No. 1973:4989 for Japanese Patent No. 47-30640 B4, Asahara et al., Aug. 9, 1972.*
European Search Report dated Apr. 18, 2002.

* cited by examiner

*Primary Examiner*—Robert Sellers
(74) *Attorney, Agent, or Firm*—Kratz, Quintos & Hanson, LLP

(57) ABSTRACT

A composition for coating having a gas barrier property comprising coating-forming components of an epoxy resin and an amine curing agent, wherein said amine curing agent is a reaction product of (A) methaxylylenediamine or paraxylylenediamineand (B) polyfunctional compound having at least one acyl group which is capable of forming amide group moiety by reaction with a polyamine to form an oligomeror or (A), (B) and (C) monocarboxylic acid having 1 to 8 carbon atoms and/or derivative thereof and a coating and a coated film a gas barrier property the same.

44 Claims, No Drawings

COMPOSITION FOR COATING HAVING A GAS BARRIER PROPERTY, COATING AND COATED FILM HAVING A GAS BARRIER PROPERTY USED THE SAME

BACKGROUND OF THE INVENTION

1) Field of the Invention

The present invention relates to a composition for coating having a gas barrier property containing an epoxy resin. The composition is applicable to wide industrial fields including coatings aimed corrosion prevention and good-looking facing and coated films having a gas barrier property to be used as packaging materials for food and medicine in which a high gas barrier property is required.

2) Prior Art

An epoxy resin is applicable to wide industrial fields including coatings aimed corrosion prevention good-looking facing and adhesives for civil engineering and construction since it has many superior characteristics such as adhesiveness, heat resistance, chemical resistance, electrical characteristic and mechanical characteristic to other resins.

Recently, among packaging materials aimed preservation of contents, plastic films and containers have come to be used mainly from the aspects of transparency, light weight and economy. As performances of a plastic film to be used as packages for food medicine and cosmetic, a barrier property against various gases, transparency, retort treatment resistance, impact resistance and a heat seal property are required. In order to maintain performances and properties of contents, a high barrier property against both oxygen and water vapor under conditions of a high humidity and post retort treatment has been particularly required.

Generally, although a gas barrier property of epoxy resin compositions to be used in the field of coating is better than that of urethane resins, acrylic resins and polyolefin resins, it does not reach to that of polyvinylidene chloride (hereinafter, "PVDC") and polyvinyl alcohol (hereinafter, "PVA") to be classified into a gas barrier material. Accordingly, when an epoxy resin coating is used, in order to depress permeation of corrosion elements, various contrivances, e.g., to enlarge a thickness of a coated film; to perform coating by overlapping other material and to use together with a filler have been performed.

On the other hand, regarding a composition for coating used an epoxy resin, a method for improving a gas barrier property against oxygen and carbon dioxide by increasing amine nitrogen content in the composition has been suggested (Japanese Patent Publications Nos. 7-91367 and 7-91368). However, since the above-mentioned composition for coating exhibits neither a remarkably high gas barrier property, nor a high gas barrier property under the condition of a high humidity, further improvement has been desired.

Japanese Publication (PCT) No. 9-511537 suggests a method for improving a gas barrier property further than the above-mentioned composition and improving a gas barrier property under the condition of a high humidity by using a composition for coating composed of modified polyamine in which a ratio of active amine hydrogen in polyamine to epoxy group in polyepoxide is at least 1.5/1 and said polyamine is starting polyamine and at least 50% of carbon atom thereof is aromatic. However, the above-mentioned composition for coating causes a problem that when coating is performed to metals and concretes for the purpose of rust prevention and corrosion prevention, inherent excellent performances of an epoxy resin such as adhesiveness, heat resistance, chemical resistance and electrical characteristics are not developed since a large amount of amine group having unreacted active amine hydrogen remains in the reaction products after coating.

Generally, a gas barrier property of a thermoplastic film is not so high. Thus, as means to provide a gas barrier property to a thermoplastic film, hitherto, a method for coating PVDC resin has been mainly used. However, the PVDC coated film to be prepared by this method has become problem in that there is a fear that a toxic gas such as dioxin is generated during combustion because it contains halogen atom, so that environmental destroy is caused.

As arts to replace it, ethylene-vinyl acetate copolymer saponified product (hereinafter, "EVOH resin") film, PVA coating and inorganic vapor deposition film vapor deposited silica ($SiO_2$) or alumina ($Al_2O_3$) on a flexible polymer film have been known. The EVOH resin film and PVA coated film causes problems that when they are exposed to moisture under a high humidity or subjected to a boiling treatment or a retort treatment, its oxygen barrier property is remarkably deteriorated. Further, the inorganic vapor deposition film causes problems that crack or pin hole is generated in a gas barrier layer by bending since the gas barrier layer is formed by vapor deposition of a hard inorganic compound, so that its gas barrier property is remarkably deteriorated. Furthermore, such vacuum vapor deposition film necessitates a larger scale of production apparatus than coating or laminate film, so that it becomes a high price in the aspect of production cost.

Such packaging material having a gas barrier property is usually constituted by laminating each materials such as a flexible polymer film layer as a base material, a gas barrier layer and a flexible polymer film layer as sealant layer. Among them, as gas barrier materials to form a gas barrier layer, a PVDC coating and film, an EVOH film, a metaxylylene azipamide film, an inorganic vapor deposition film vapor deposited alumina or silica, a PVA coating and an epoxy coating increased amine nitrogen content in a composition (Japanese Patent Publication Nos. 7-91367 and 7-91368) have been known and applied by classification depending on species of contents and uses thereof based on their characteristics. However, such materials having a gas barrier property have not always good adhesiveness to various flexible polymer films. Thus, when a flexible polymer film as a sealant layer is laminated on a gas barrier layer, a dry laminating method for coating an adhesive on a gas barrier layer, thereby adhering a sealant layer and an extrusion laminating method for coating, optionally, an anchor coating agent on a gas barrier layer and adhering under an applied pressure a molten polymer layer as a sealant layer thereon, thereby laminating in a film form have been applied.

As an adhesive to be used in such methods, a two-liquid type polyurethane adhesive composed of a main gradient having an active hydrogen group(s) such as hydroxyl group and a curing agent having an isocyanate group(s) has been mainly used from the aspect of high adhesiveness, e.g., Japanese Patent Kokai (Laid-open) No. 9-316422. That is, in conventional laminate films for packaging material having a gas barrier property, in order to supplement adhesiveness between a gas barrier layer and a flexible polymer film layer as a sealant layer, it was necessary to provide another layer such as an adhesive layer and an anchor coat layer to perform a role of adhesiveness between the gas barrier layer and the flexible polymer film layer as a sealant layer, so that disadvantages were caused in the aspects economy and workability in the production steps.

Further, when laminating was performed with a two-liquid type polyurethane adhesive, it was necessary to perform post curing by aging after adhering in order to ensure sufficient adhesiveness. The aging time was as very long as 1 to 5 days since curing reaction of a polyurethane adhesive is generally so not rapid. When unreacted isocyanate group remained after curing, it was not preferable from the aspects of safety and hygiene, particularly in use of a packaging material for food. Further, there was a problem that the remained isocyanate group reacted moisture in the atmosphere to generate carbon monoxide, so that foams were generated in the interior of a film of a laminate layer.

SUMMARY OF THE INVENTION

An object of the present invention is to solve the above-mentioned prior art problems and to provide a composition for coating having a high gas barrier property comprising an epoxy resin and an amine curing agent in addition to inherent excellent performances of an epoxy resin and a coating comprising said compositin and a non-halogen coated film excellent in a gas barrier property, transparency, impact resistance and retort treatment resistance applied said coating and a multilayered laminate excellent in a gas barrier property, transparency, impact resistance, retort treatment resistance and a heat seal property comprising said coated film.

As a result of extensive studies to solve the above-mentioned prior art problems, the inventors have found that a composition for coating comprising an epoxy resin and specific amine curing agent possesses a high gas barrier property in addition to inherent excellent performances of an epoxy resin and a non-halogen coated film excellent in a gas barrier property, transparency, impact resistance and retort treatment resistance by applying a coating comprising said composition can be obtained and furthermore a multilayerd laminate excellent in a gas barrier property, transparency, impact resistance, retort treatment resistance and a heat seal property comprising said coated film can be obtained, and have accomplished the present invention.

That is the present invention provides a composition for coating having a gas barrier property comprising coating-forming components of an epoxy resin and an amine curing agent, wherein said amine curing agent is a reaction product of the following (A) and (B) or (A), (B) and (C).

(A) metaxylylenediamine or paraxylylenediamine.

(B) polyfunctional compound having at least one acyl group which is capable of forming amide group moiety by reaction with a polyamine to form an oligomer.

(C) monocarboxylic acid having 1 to 8 carbon atoms and/or derivative thereof.

The present invention provides a coating comprising the above-mentioned composition for coating having a gas barrier property.

The present invention provides a coated film having a gas barrier property coated a gas barrier layer on at least one side of a flexible polymer film, wherein said gas barrier layer is a layer formed by cure of a composition for coating having a gas barrier property comprising coating-forming components of an epoxy resin and an amine curing agent, wherein said amine curing agent is a reaction product of the following (A) and (B) or (A), (B) and (C).

(A) metaxylylenediamine or paraxylylenediamine.

(B) polyfunctional compound having at least one acyl group which is capable of forming amide group moiety by reaction with a polyamine to form an oligomer.

(C) monocarboxylic acid having 1 to 8 carbon atoms and/or derivative thereof.

The present invention provides a multilayered laminate having a gas barrier property comprising two outer layers ($S_1$) and ($S_2$) and at least one intermediate layer comprising at least one gas barrier layer (G) interposed between said two outer layers ($S_1$) and ($S_2$), wherein said gas barrier layer (G) is a layer formed by cure of a composition for coating having a gas barrier property comprising coating-forming components of an epoxy resin and an amine curing agent, wherein said amine curing agent is a reaction product of the following (A) and (B) or (A), (B) and (C).

(A) metaxylylenediamine or paraxylylenediamine.

(B) polyfunctional compound having at least one acyl group which is capable of forming amide group moiety by reaction with a polyamine to form an oligomer.

(C) monocarboxylic acid having 1 to 8 carbon atoms and/or derivative thereof.

DETAILED DESCRIPTION OF THE INVENTION

The present invention will be described in detail below.

The composition for coating having a gas barrier property of the present invention comprises coating forming components of an epoxy resin and an amine curing agent.

The epoxy resin to be used in the present invention may be any of saturated or unsaturated aliphatic compound and alicylic compound, aromatic compound and heterocyclic compound. When development of a high gas barrier property is considered, an epoxy resin containing an aromatic ring(s) in its molecule is preferable.

Examples of preferable epoxy resin include is at least one resin selected from the group consisting of an epoxy resin with glycidylamine moiety derived from metaxylylenediamine, an epoxy resin with glycidylamine moiety derived from 1,3-bis(aminomethyl) cyclohexane, an epoxy resin with glycidylamine moiety derived from diaminodiphenyl methane, an epoxy resin with glycidylamine moiety derived from paraamino phenol, an epoxy resin with glycidylether moiety derived from bisphenol A, an epoxy resin with glycidylether moiety derived from bisphenol F, an epoxy resin with glycidylether moiety derived from phenol novolac and an epoxy resin with glycidylether moiety derived from resorcinol.

Among them, an epoxy resin with glycidylamine moiety derived from metaxylylenediamine is particulary more preferable. The epoxy resin with glycidylamine moiety derived from metaxylylenediamine can be obtained by reaction to add epichlorohydrin to metaxylylenediamine. The above-mentioned glycidylamine moiety includes mono-, di-, tri- and/or tetra-glycidylamine moiety which can be substitute for four hydrogen atoms of diamine in metaxylyienediamine. Each ratio of mono-, di-, tri- and/or tetra-glycidylamine can be changed by reaction ratio of epichlorohydrin to metaxylylenediamine. For example, when about 4 times by mol of epichlorohydrin to 1 mol of metaxylylenediamine is added, an epoxy resin with tetraglycidylamine moiety.

Likewise, an epoxy resin with with glycidylamine moiety derived from 1,3-bis(aminomethyl) cyclohexane and an epoxy resin with with glycidylamine moiety derived from diaminodiphenyl methane include mono-, di-, tri- and/or tetra-glycidylamine moiety. An epoxy resin with glycidylamine moiety derived from paraamino phenol includes mono-, di- and/or tri-glycidylamine moiety. An epoxy resin with glycidylether moiety derived from bisphenol A, an epoxy resin with glycidylether moiety derived from bisphenol F and an epoxy resin with glycidylether moiety derived from resorcinol include mono-, di- and/or tri- glycidylether moiety.

The epoxy resin in the present invention is synthesized by reaction of each of alcohols, phenols and amines with an epihalohydrin such as epichlorohydrin which is generally applied.

The epoxy resin in the present invention is usually synthesized by reacting each of alcohols, phenols and amines with excess epihalohydrin in the presence of an alkali such as sodium hydroxide at a temperature of 20 to 140° C. and preferably 50 to 120° C. in case of alcohols and phenols and 20 to 70° C. in case of amines and separating produced alkali halogenide.

The number average molecular weight of the epoxy resin thus produced is different depending on molar ratio of epihalohydrin to each of alcohols, phenols and amines and about 80 to 4000, preferably about 200 to 1000 and more preferably about 200 to 500.

The amine curing agent of the present invention is a reaction product of the following (A) and (B) or (A), (B) and (C).

(A) metaxylyienediamine or paraxylylenediamine.

(B) polyfunctional compound having at least one acyl group which is capable of forming amide group moiety by reaction with a polyamine to form an oligomer (hereinafter, "(B) polyfunctional compound").

(C) monocarboxylic acid having 1 to 8 carbon atoms and/or derivative thereof.

Examples of (B) polyfunctional compound include carboxylic acids such as acrylic acid, methacrylic acid, maleic acid, fumaric acid, succinic acid, malic acid, tartaric acid, adipic acid, isophthalic acid, terephthalic acid, pyromellitic acid, trimellitic acid and derivatives thereof, e.g., ester, amide, acid anhydride and acid chloride, among which acrylic acid, methacrylic acid and derivatives thereof are particularly preferable.

Regarding the reaction of (A) metaxylylenediamine or paraxylylenediamine and (B) a polyfunctional compound in the amine curing agent of the present invention, (hereinafter, "the reaction of (A) and (B)"), when carboxylic acid, an ester thereof or an amide thereof is used as (B) polyfunctional compound, the reaction of (A) and (B) is performed by mixing (A) metaxylylenediamine or paraxylylenediamine and (B) polyfunctional compound at a temperature of 0 to 100° C. and then conducting amide group formation reaction due to dehydration, dealcoholization and deamination at a temperature of 100 to 300° C. and preferably 130 to 250° C.

In the amide group formation reaction, in order to complete perfectly the reaction, if necessary, a reduced pressure treatment of the reactor interior may be performed at the final stage of the reaction. Further, if necessary, dilution may be performed with a non-reactive solvent. A catalyst such as sulfite also may be added as a dehydrating agent or a dealcoholizing agent.

When an acid anhydride or an acid chloride is used as (B) polyfunctional compound, the reaction of (A) and (B) is performed by mixing (A) metaxylylendiamine or paraxylylendiamine and (B) polyfunctional compound at a temperature of 0 to 150° C. and preferably 0 to 100° C. and then conducting the amide group formation reaction.

In the amide group formation reaction, in order to complete perfectly the reaction, if necessary, a reduced pressure treatment of the reactor interior may be performed at the final stage of the reaction. Further, if necessary, dilution may be performed by a non-reactive solvent. A tertiary amine such as pyridine, picoline, lutidine and trialkylamine may be added.

Examples of (C) monocarboxylic acid having 1 to 8 carbon atoms and derivative thereof include formic acid, acetic acid, propionic acid, butyric acid, lactic acid, glycolic acid, benzoic acid and derivatives thereof, e.g., ester, amide, acid anhydride and acid chloride. The reaction (C) monocarboxylic acid having 1 to 8 carbon atoms and derivative thereof and a starting polyamine together with (B) polyfunctional compound may be performed.

The amide group moiety to be introduced by the above-mentioned reaction possesses a high cohesive force. A high barrier property against oxygen and a good adhesiveness to base materials such as concrete and plastic can be obtained due to the presence of the amide group moiety in a high proportion in the amine curing agent.

It is preferable that reaction ratio of (B) polyfunctional compound to (A) metaxylylenediamine or paraxylylenediamine is in the range of molar ratio 0.3 to 0.95. When the molar ratio is below 0.3, a sufficient amount of amide group is not formed in the amine curing agent, so that a high level of gas barrier property is not developed. When the molar ratio is above 0.95, an amount of amino group to react an epoxy resin becomes small, so that excellent performances of coated film is not developed and furthermore workability during coating is worsened since it becomes a high viscosity.

The curing reaction of the composition for coating having a gas barrier property of the present invention is carried out in a concentration of the composition and a temperature sufficient to obtain a curing reaction product thereof, which can be changed by selection of starting materials. That is, the concentration of the composition can be changed from case to use no solvent to case of about 5% by weight concentration of the composition in a suitable organic solvent and/or water, depending on species and molar ratio of selected material. Likewise, the curing reaction temperature can be selected in the range of from a room temperature to about 140° C.

The blending ratio of amine curing agent to epoxy resin in the composition for coating having a gas barrier property of the present invention may be in the standard blending range in conventional preparation of an epoxy resin reaction product by reaction of an epoxy resin and an amine curing agent. In detail, the ratio of active amine hydrogen number in an amine curing agent to epoxy resin number in an epoxy resin is in the range of 0.5 to 5.0 and preferably 0.8 to 3.0.

Examples of preferable organic solvent include glycol ethers such as 2-methoxyethanol, 2-ethoxyethanol, 2-propoxyethanol, 2-butoxyethanol, 1-methoxy-2-propanol, 1-ethoxy-2-propanol and 1-propoxy-2-propanol, alcohols such as methanol, ethanol, 1-propanol, 2-propanol, 1-butanol and 2-butanol, non-proton polar solvents such as N,N-dimethyl formamide, N,N-dimethyl acetoamide, dimethyl sulfoxide and N-methyl pyrrolidone and water insoluble solvents such as toluene, xylene and ethyl acetate, among which water soluble solvents such as glycol ethers and alcohols in the coating and low boiling point solvents such as methanol and ethyl acetate in the coated film and the multilayered laminate are more preferable.

When the composition for coating having a gas barrier property of the present invention is coated on conventional base materials such as metal, concrete and plastics, in order to supplement wetting of a surface of each base materials, a wetting agent such as silicon or acrylic compound may be added to the composition for coating having a gas barrier property of the present invention. Examples of preferable wetting agent include BYK331, BYK333, BYK348 and BYK381 obtainable from Big Chemi Co. It is preferable that the wetting agent is added in the range of 0.01 to 2.0% by weight to total weight of curing reaction product. The wetting agent can be used also in the multilayered laminate.

In the present invention, a coating comprising the above-mentioned composition for coating having a gas barrier property can be obtained. If necessary, solvents, pigments, etc., may be mixed in the coating.

The composition for coating having a gas barrier property of the present invention and the coating obtainable from the composition can be coated on materials to be coated such as metal and concrete for the purpose of corrosion prevention and good-looking facing to which conventional epoxy resin coating is applied. Further, it becomes possible to coat the composition or the coating on various gas permeable base materials to require a high gas barrier property to which conventional epoxy resin coating cannot be applied on account of its low gas barrier property, e.g., plastic films for food and medicine.

The coated film of the present invention can be obtained by coating the composition for coating having a gas barrier property on least one side of a flexible polymer film and curing to form a gas barrier layer.

The flexible polymer film in the present invention is not limited on the condition that the gas barrier layer to be formed by coating materials comprising an epoxy resin and an amine curing agent can be maintained.

Examples of the flexible polymer film include polyolefin films such as polyethylene and polypropylene, polyester films such as polyethylene terephthalate, polyamide films such as nylon 6 and nylon 66, polyacryl films, polystyrene films, EVOH films and PVA films, among which polyolefin films, polyester films and polyamide films are preferable.

The flexible polymer film may be a film stretched to the direction of uniaxis or biaxis. It is practical that its thickness is about 10 to 300 μm and preferably about 10 to 100 μm. It is preferable that the flexible polymer film is subjected to various surface treatments such as flame treatment and corona discharge treatment so as to form a coated film as a gas barrier layer to cause no defect such as discontinuity (occurrence of non-coated portion) of a coated film and repelling against coating during coating with a coating solution. Such treatments promote good adhesion of the gas barrier layer to the flexible polymer film.

In order to improve each performance of a gas barrier property and impact resistance of the coated film or coated materials having a gas barrier property in the present invention, inorganic fillers such as silica, alumina, mica, talc, aluminum flake and glass flake may be added to the composition. When transparency of the coated film is considered, it is preferable that such inorganic fillers have a flat plate shape. It is preferable that an amount of such inorganic fillers to be added is in the range of 0.01 to 10% by weight to total weight of curing reaction products.

As methods for coating the flexible polymer film with a coating solution, any method for coating to be generally applied including roll coating, spray coating, air knife coating, immersion and brush coating may be applied to coating in the present invention. Among them, roll coating or spray coating is preferable. For example, conventional roll coating, spraying art and equipments thereof to coat curing coating components can be applied.

It is practical that thickness of the gas barrier layer after coating a coating solution on the flexible polymer film, drying and performing heat treatment is 0.1 to 100 μm and preferably 0.5 to 10 μm. When the thickness is below 0.1 μm, it is difficult to develop satisfactory gas barrier property, whereas as above 100 μm, unevenness of the coated film thickness occurs.

The multilayered laminate of the present invention comprises two outer layers ($S_1$) and ($S_2$) and at least one intermediate layer comprising at least one gas barrier layer (G) interposed between said two outer layers ($S_1$) and ($S_2$), wherein said gas barrier layer. (G) is a layer formed by curing the composition for coating having a gas barrier property of the present invention.

The embodiments of each layer in the multilayerd laminate having a gas barrier property of the present invention are exemplified as follows.

(1) A case where each outer layers ($S_1$) and ($S_2$) are flexible polymer film layer (F).

Examples of the multilayered laminate include flexible polymer film layer (F)-gas barrier layer (G)-flexible polymer film layer (F), flexible polymer film layer (F)-gas barrier layer (G)-paper layer (P)-gas barrier layer (G)-flexible polymer film layer (F), flexible polymer film layer (F)-gas barrier layer (G)-paper layer (P)-gas barrier layer (G)-metallic foil layer (M)-gas barrier layer (G)-flexible polymer film layer (F), flexible polymer film layer (F)-gas barrier layer (G)-paper layer (P)-adhesive layer(H)-flexible polymer film layer (F) and flexible polymer film layer (F)-gas barrier layer (G)-flexible polymer film layer (F)-gas barrier layer (G)-flexible polymer film layer (F).

(2) A case where outer layer ($S_1$) is flexible polymer film layer (F) and outer layer ($S_2$) is paper layer (P) or metallic foil layer (M).

Examples of the multilayerd laminate include flexible polymer film layer (F)-gas barrier layer (G)-paper layer (P), flexible polymer film layer (F)-gas barrier layer (G)-metallic foil layer (M) and flexible polymer film layer (F)-gas barrier layer (G)-metallic foil layer (M)-gas barrier layer (G)-paper layer (P).

(3) A case where outer layer ($S_1$) is paper layer (F) or metallic foil layer (M) and outer layer ($S_2$) is paper layer (F) or metallic foil layer (M).

Examples of the multilayered laminate include paper layer (P)-gas barrier layer (G)-metallic foil layer (M), layer (P)-gas barrier layer (G)-layer (P), metallic foil layer (M)-gas barrier layer (G)-metallic foil layer (M), paper layer (P)-gas barrier layer (G)-flexible polymer film layer (F)-gas barrier layer (G)-metallic foil layer (M), paper layer (P)-gas barrier layer (G)-flexible polymer film layer (F)-gas barrier layer (G)-paper layer (P) and metallic foil layer (M)-gas barrier layer (G)-flexible polymer film layer (F)-gas barrier layer (G)-metallic foil layer (M).

In order to improve adhesion of gas barrier layer (G) constituting the multialyered laminate having a gas barrier property of the present invention to flexible polymer film layer (F), metallic foil layer (F) and paper layer (P), if necessary, tackifiers such as xylene resin, terpene resin, phenolic resin and rosin resin and titanium coupling agent may be added to the gas barrier layer (G). It is preferable that they are added in the range of 0.01 to 5.0% by weight to total weight of adhesive composition.

The above-mentioned inorganic fillers to be used in the coated film having a gas barrier property of the present invention are effective also in gas barrier layer (G) constituting the multilayered laminate of the present invention.

The flexible polymer film layer (F) to be used in the multilayered laminate having a gas barrier property of the present invention can be classified into each role of a base material film layer to support a gas barrier layer and a sealant layer as a heat seal portion in the formation of a packaging material. The performances such as strength and melting point to be required in these layers are different to each other, depending their roles. They are described in detail below.

The material and the thickness to be applied to flexible polymer film layer (F) as a base material film layer are the same as those of the coated film having a gas barrier layer property of the present invention.

It is preferable that the surface of flexible polymer film (F) is subjected to various surface treatments such as flame treatment and corona discharge treatment so as to form gas barrier layer (G) to cause no defect such as discontinuity of a coated film and replling against coating. Such treatments promote good adhesion of gas barrier layer (G) to flexible polymer film layer (F). Further, after the completion of suitable surface treatment on a surface of flexible polymer film (F), if necessary, print-treatment can be performed on its surface. When print-treatment is performed, conventional printing machines such as gravure printer, flexography printer and offset printer which have been applied to printing of conventional polymer films can be applied also in the present invention. As inks for print treatment, inks to be prepared from pigments such as azo pigment and phthalocyanin pigment, resins such as rosin, polyamide resin and polyurethane and solvents such as methanol, ethyl acetate and methylethyl ketone which have been applied to printing of conventional polymer film can be applied also in the present invention.

Flexible polymer film layer (F) as a sealant layer can be selected from the same polymer films as in flexible polymer film (F) as a base material. When a heat seal property is considered, polyolefin films such as polyethylene film, polypropylene film, and ethylene-vinyl acetate copolymer are preferable. The thickness of flexible polymer film layer (F) as a sealant layer is the same as in flexible polymer film layer (F) as a base material film layer. Its surface may be subjected to surface treatments such as flame treatment and corona discharge treatment. Such treatments promote good adhesion of gas barrier layer (G) to flexible polymer film layer (F) as a sealant layer.

The oxygen permeation factor ($PO_2$) of the gas barrier layer under the conditions of temperature 23° C. and relative humidity 60% is 0.2 cc-mm/m²·day·atm or below.

$$1/R = 1/R_n (n=1,2,\ldots) + DFT/PO_2$$

R: oxygen permeability (cc/m²·day·atm) of a coating-treated plastic film $R_n$(n=1,2, ... ):
  oxygen permeability (cc/m²·day·atm) of a film as a base material DFT: thickness (mm) of gas barrier layer $PO_2$: oxygen permeation factor (cc-mm/m²·day·atm) of gas barrier layer The oxygen permeability of the multilayerd laminate having a gas barrier property of the present invention under the conditions of temperature 23° C. and relative humidity 60% is 20 cc/m²·day·atm or below.

As methods for coating the flexible polymer film with a costing solution, any method for coating to be generally applied including roll coating, spray coating, air knife coating, immersion and brush coating may be applied to coating in the present invention. Among then, roll coating or spray coating is preferable. For example, conventional roll coating, spray art and equipments thereof to coat curing coating components cab be applied.

It is practical that a thickness of the gas barrier layer after coating a coating solution on the flexible polymer film, drying and performing heat treatment is 0.1 to 100 μm and preferably 0.5 to 10 μm. When the thickness is below 0.1 μm, it is difficult to develop satisfactory gas barrier property, whereas as above 100 μm, unevenness of the coated film thickness occurs.

Further, in the multilayered laminate of the present invention, if necessary, metallic foil layer (M) such as aluminum, oxygen absorbing layer and paper layer (carton layer) (P) also can be laminated.

When gas barrier layer (G) is used, it has functions as adhesive layer (H) or anchor coat layer. Therefore, gas barrier layer (G) can be set on the surface of flexible polymer film (F) etc., without providing adhesive layer (H) or anchor coat layer. In the present invention, good adhesion between flexible polymer film layer (F) and gas barrier layer (G) can be secured without providing adhesive layer (H) or anchor coat layer because most functional groups present in epoxy resin curing products to form gas barrier layer (G) perform intensive interaction with a surface of the flexible polymer film layer (F). Further, since the epoxy resin curing products to form gas barrier layer (G) of the present invention are excellent in both tenacity and wetting resistance, a laminate having a gas barrier property which is excellent in impact resistance and retort treatment resistance can be obtained from the epoxy resin curing products. It is possible also to provide adhesive layer (H) or anchor coat layer in the multilayered laminate having a gas barrier layer of the present invention.

When flexible polymer film layer (F) including a flexible polymer film layer as a sealant layer is laminated on a surface of gas barrier layer (G), known laminating methods such as dry laminating method and extrude laminating method can be applied. That is, in a dry laminating method, a solution containing the composition for coating having a gas barrier property to form gas barrier layer (G) is coated on flexible polymer film layer (F) as a base material and then solvent is removed by drying and then immediately another flexible polymer film is adhered onto its surface, whereby the multilayered laminate can be obtained. In this case, after laminating, if necessary, it is preferable that post curing is performed at a room temperature to 140° C. for 5 seconds to about 2 day.

Moreover, in an extrude laminating method, a solution containing the composition for coating having a gas barrier property to form gas barrier layer (G) is coated on flexible polymer film layer (F) as a base material and then solvent is removed by drying at a room temperature to 140° C. and curing reaction is performed to form gas barrier layer (G) and then another molten polymer material can be laminated on its surface with an extruder.

If necessary, the above-mentioned steps and other laminating methods can be combined. The constitution of the multilayer laminate can be changed depending on its use and its form.

PREFERRED EMBODIMENT OF THE INVENTION

The present invention will be described in more detail below, referring to Examples, which are not intended to limit the scope of the present invention.

Amine curing agents A to F described in Examples were prepared by the following processes.

Amine Curing Aagent A 1 mol of metaxylylendiamine was charged to a reactor. Its interior temperature was raised to 60° C. in a nitrogen gas stream and 0.5 mol of methyl acrylate was dropwise added thereto over one hour. After the dropwise addition, stirring was performed at 120° C. for one hour and its interior temperature was further raised up to 180° C. in hours while distilling off produced methanol, whereby amine curing agent A was obtained.

Amine Curing Agent B 1 mol of metaxylylendiamine was charged to a reactor. Its interior temperature was raised to 60° C. in a nitrogen gas stream and 0.67 mol of methyl acrylate was dropwise added thereto over one hour. After the dropwise addition, stirring was performed at 120° C. for one hour and its interior temperature was further raised up to 180° C. in 3 hours while distilling off produced methanol. Its interior temperature was cooled to 100° C. and a prescribed amount of 1-methoxy-2-propanol (MFG) was added thereto so as to make a solid matter concentration 70% by weight, whereby amine curing agent B was obtained.

Amine Curing Agent C 1 mol of metaxylylendiamine was charged to a reactor. Its interior temperature was raised to 60° C. in a nitrogen gas stream and 0.8 mol of methyl acrylate was dropwise added thereto over one hour. After the dropwise addition, stirring was performed at 120° C. for one hour and its interior temperature was further raised up to 180° C. in 3 hours while distilling off produced methanol. Its interior temperature was cooled to 100° C. and a prescribed amount of MFG was added thereto so as to make a solid matter concentration 70% by weight, whereby amine curing agent C was obtained.

Amine Curing Agent D 1 mol of metaxylylendiamine was charged to a reactor. Its interior temperature was raised to 120° C. in a nitrogen gas stream and 0.8 mol of methyl methacrylate was dropwise added thereto over one hour. After the dropwise addition, stirring was performed at 150° C. for one hour and its interior temperature was further raised up to 180° C. in 3 hours while distilling off produced methanol. Its interior temperature was cooled to 100° C. and a prescribed amount of MFG was added thereto so as to make a solid matter concentration 70% by weight, whereby amine curing agent D was obtained.

Amine Curing Agent E 1 mol of metaxylylendiamine was charged to a reactor. Its interior temperature was raised to 120° C. in a nitrogen gas stream and 0.67 mol of methyl acrylate was dropwise added thereto over one hour and stirring was performed at 120° C. for 0.5 hour. 0.33 mol of acetic acid was further dropwise added thereto over 0.5 hour and stirring was performed for one hour. Its interior temperature was further raised up to 180° C. in 3 hours while distilling off produced methanol. Its interior temperature was cooled to 100° C. and a prescribed amount of MFG was added thereto so as to make a solid matter concentration 70% by weight, whereby amine curing agent E was obtained.

Amine Curing Agent F 1 mol of metaxylylendiamine was charged to a reactor. Its interior temperature was raised to 120° C. in a nitrogen gas stream and 0.5 mol of methyl acrylate was dropwise added thereto over one hour and stirring was performed at 120° C. for 0.5 hour. 0.17 mol of malic acid was further dropwise added thereto little by little and stirring was performed for 0.5 hour. Its interior temperature was further raised up to 180° C. in 3 hours while distilling off produced methanol. Its interior temperature was cooled to 100° C. and a prescribed amount of MFG was added thereto so as to make a solid matter concentration 70% by weight, whereby amine curing agent F was obtained.

The evaluation of performances of coated film was performed according to the following methods.

[Oxygen Permeation Factor (cc-mm/m$^2$·day·atm)]

An oxygen permeability of a coating-treated plastic film was measured with an oxygen permeability measurement apparatus, manufactured by Modern Control Co., OX-TRAN10/50A under the conditions of 23° C. and relative humidity 60% and an oxygen permeation factor of the coated film was calculated from the following formula.

$$1/R_1 = 1/R_2 + DFT/PO_2$$

$R_1$: oxygen permeability (cc/m$^2$·day·atm) of a coating-treated plastic film $R_2$: oxygen permeability (cc/m$^2$·day·atm) of a film as a base material DFT: thickness (mm) of coated film $PO_2$: oxygen permeation factor (cc-mm/m$^2$·day·atm) of a coated film The coating solution and the base material are shown below.

Base material: polyethylene terephthalate film (100 μm), manufactured by Tore k.k., in Japan, Rumiller Coating: use of bar coder No.24

Solid matter concentration of the coating solution: 40%

[Water Vapor Permeation Factor (g-mm/m$^2$·day)]

A water vapor permeability of a coating-treated plastic film was measured under the conditions of 40° C. and relative humidity 90% according to the method designated in JIS Z-0208 and a water vapor permeation factor of the coated film was calculated from the following formula.

$$1/W_1 = 1/W_2 + DFT/PH_2O$$

$W_1$: water vapor permeability (g/m$^2$·day) of a coating-treated plastic film $W_2$: water vapor permeability (g/m$^2$·day) of a film as a base material DFT: thickness (mm) of coated film $PH_2O$: water vapor permeation factor of a coated film The coating solution and the base material are shown below.

Base material: polyethylene terephthalate film (100 μm), manufactured by Tore k.k., in Japan, Rumiller Coating: use of bar coder No.8

Solid matter concentration of the coating solution: 40%

[Chemical Resistance]

Non-coated portion of a steel sheet coated with coating sample was coated with paraffin. The steel sheet thus obtained was immersed in each of distilled water, methanol and toluene at 23° C. or subjected to salt water spraying, Its change after one week was observed. Appearance of coating prior to immersion or spraying and after immersion or spraying were visually evaluated based on the following four criteria.

Ex: No change of appearance occurred.
G: Initial appearance was about maintained.
F: Slight change of appearance occurred.
P: Change of appearance occurred.

The coating solution and the base material are shown below.

Base material: cold rolled steel sheet(JIS G 3141, 70×150×0.6 mm) sanding-treated (#240) and then rinsed with xylene and then applied.
Coating: use of doctor blade
Solid matter concentration of the coating solution: 70%

EXAMPLE 1

A MFG solution containing 33 parts by weight of amine curing agent A and 50 parts by weight of an epoxy rein with tetraglycidylamine moiety derived from metaxylylenediamine, manufactured by Mitsubishi Gas Chemical Co., Inc., TETRAD-X was prepared and 0.02 parts by weight of an acrylic wetting agent, manufactured by Big.Chemi Co., BYK381 was added thereto and stirring was sufficiently performed, whereby a coating solution was prepared. The coating solution thus obtained was coated on each base material and curing reaction was performed at 60° C. for one hour and then further at 120° C. for 30 minutes, whereby coating films were prepared on each base material. Various performances for the coated films thus obtained were evaluated. The evaluation results were shown in Tables 1 and 2.

EXAMPLE 2

The coated films were prepared in the same manner as in Example 1 except that 45 parts by weight of amine curing agent B was used instead of amine curing agent A. The evaluation results were shown in Tables 1 and 2.

EXAMPLE 3

The coated films were prepared in the same manner as in Example 1 except that 57 parts by weight of amine curing agent C was used instead of amine curing agent A. The evaluation results were shown in Tables 1 and 2.

EXAMPLE 4

The coated films were prepared in the same manner as in Example 1 except that 35 parts by weight of an amine curing agent, manufactured by Mitsubishi Gas Chemical Co., Inc., in Japan, Gaskamine 340, composed of a reaction product of metaxylylenediamine and methyl methacrylate in molar ratio about 2/1 of metaxylylenediamine to methyl methacrylate was used instead of amine curing agent A. The evaluation results were shown in Tables 1 and 2.

EXAMPLE 5

The coated films were prepared in the same manner as in Example 1 except that 61 parts by weight of amine curing agent D was used instead of amine curing agent A. The evaluation results were shown in Tables 1 and 2.

EXAMPLE 6

The coated films were prepared in the same manner as in Example 1 except that 72 parts by weight of amine curing agent E was used instead of amine curing agent A. The evaluation results were shown in Tables 1 and 2.

EXAMPLE 7

The coated films were prepared in the same manner as in Example 1 except that 50 parts by weight of amine curing agent F was used instead of amine curing agent A. The evaluation results were shown in Tables 1 and 2.

COMPARATIVE EXAMPLE 1

The coated films were prepared in the same manner as in Example 1 except that 65 parts by weight of an amine curing agent, manufactured by Mitsubishi Gas Chemical Co., Inc., in Japan, Gaskamine 328, composed of an addition product of metaxylylenediamine and epichlorohydrin in molar ratio about 2/1 of metaxylylenediamine to epichlorohydrin was used instead of amine curing agent A. The evaluation results were shown in Tables 1 and 2.

COMPARATIVE EXAMPLE 2

The coated films were prepared in the same manner as in Example 1 except that 30 parts by weight of a conventional polyamide-modified polyamine modified with dimer acid, Fuji Kasei k.k., in Japan, Tomaido 225-X as amine curing agent and 50 parts by weight of an epoxy resin with diglycidylether moiety derived from bisphenol A, manufactured by Yuka Shell Epoxy k.k., in Japan, Epicoat 828 as epoxy resin were used.

Amine curing agents G to K were prepared by the following processes.

Amine Curing Agent G 1 mol of metaxylylendiamine was charged to a reactor. Its interior temperature was raised to 60° C. in a nitrogen gas stream and 0.67 mol of methyl acrylate was dropwise added thereto over one hour. After the dropwise addition, stirring was performed at 120° C. for one hour and its interior temperature was further raised up to 180° C. in 3 hours while distilling off produced methanol. Its interior temperature was cooled to 100° C. and a prescribed amount of methanol was added thereto so as to make a solid matter concentration 70% by weight, whereby amine curing agent G was obtained.

Amine Curing Agent H 1 mol of metaxylylendiamine was charged to a reactor. Its interior temperature was raised to 60° C. in a nitrogen gas stream and 0.50 mol of methyl acrylate was dropwise added thereto over one hour. After the dropwise addition, stirring was performed at 120° C. for one hour and its interior temperature was further raised up to 180° C. in 3 hours while distilling off produced methanol. Its interior temperature was cooled to 100° C. whereby amine curing agent H was obtained.

Amine Curing Agent I 1 mol of metaxylylendiamine was charged to a reactor. Its interior temperature was raised to 120° C. in a nitrogen gas stream and 0.50 mol of methyl acrylate was dropwise added thereto over one hour. After the dropwise addition, stirring was performed at 120° C. for 0.5 hour. 0.17 mol of maleic acid was further added thereto little by little and stirring was performed for 0.5 hour. Its interior temperature was raised up to 180° C. in 3 hours while distilling off produced methanol. Its interior temperature was cooled to 100° C. and a prescribed amount of methanol was added thereto so as to make a solid matter concentration 70% by weight, whereby amine curing agent I was obtained.

Amine Curing Agent J 1 mol of metaxylylendiamine was charged to a reactor. Its interior temperature was raised to 120° C. in a nitrogen gas stream and 0.67 mol of methyl acrylate was dropwise added thereto over one hour and stirring was performed at 120° C. for 0.5 hour. 0.33 mol of acetic acid was added thereto over 0.5 hour and stirring was performed for one hour. Its interior temperature was raised up to 180° C. in 3 hours while distilling off produced methanol. Its interior temperature was cooled to 100° C. and a prescribed amount of methanol was added thereto so as to make a solid matter concentration 70% by weight, whereby amine curing agent J was obtained.

Amine Curing Agent K 1 mol of tetraethylenepetamine was charged to a reactor. Its interior temperature was raised to 100° C. in a nitrogen gas stream and 0.4 mol of an epoxy resin with diglycidylether moiety derived from bisphenol A, manufactured by Japan Epoxy Resin k.k., Epicoat 828 was dropwise added thereto over one hour and stirring was performed for 2 hours. A prescribed amount of methanol was added thereto so as to make a solid matter concentration 40% by weight, whereby amine curing agent K was obtained.

The evaluation of each performances was performed according to the following methods.

[Oxygen Permeability (cc/$m^2$ ·day·atm)]

An oxygen permeability of a coating-treated plastic film was measured with an oxygen permeability measurement apparatus, manufactured by Modern Control Co., OX-TRAN10/50A under the conditions of 23° C. and relative humidity 60%. Further, an oxygen permeability under high humidity was measured under each condition of 23° C. and relative humidity 80 and 90%.

[Impact Resistance (Oxygen Permeability after Gerbo Treatment (cc/$m^2$·day·atm))]

An oxygen permeability of a coated film subjected to twist treatment of 360 degree 50 times with Gerbo flex tester, manufactured by Rigaku Kogyo k.k., in Japan was measured under the conditions of 23° C. and relative humidity 60%.

[Oxygen Permeability after Retort Treatment (cc/$m^2$·day·atm)]

An oxygen permeability of a coated film subjected to retort treatment at 121° C. for 30 minutes was measured with Retort Food Autoclave, manufactured by Tomy Co., under the conditions of 23° C. and relative humidity 60%.

[Water Vapor Permeation Factor (g-mm/$m^2$·day)]

An water vapor permeability of a coated film was measured under the conditions of 40° C. and relative humidity 90% according to the method designated in JIS Z-0208.

[Interlayer Adhesiveness (g/15 mm)]

A linear low density polyethylene film of thickness 40 μm, manufactured by Toyobo k.k., in Japan, Ricks was adhered onto a gas barrier layer of a coated film with a heat roller of 110° C., whereby a test specimen was prepared. An interlayer adhesiveness of the test specimen or a laminate sample was measured at a peeling rate of 100 mm/min by T type peeling test according to the method designated in JIS K-6854.

[Appearance of Laminate]

The measurement was visually performed.

[Heat Seal Strength of Laminate (kg/15 mm)]

A test specimen of a laminate subjected to heat seal treatment with a heat seal treatment apparatus(manufactured by Toyoseiki Seisakusho k.k., in Japan, a thermal inclination tester) under the treating conditions of 150° C., 2 kg/$cm^2$ and 1 second was evaluated at a tensile rate of 100 mm/min.

EXAMPLE 8

A methanol/ethyl acetate=1/1 solution (solid matter concentration; 30% by weight) containing 90 parts by weight of amine curing agent G and 50 parts by weight of an epoxy resin with tetraglycidylamine derived from metaxylylenediamine, manufactured by Mitsubishi Gas Chemical Co., Inc., TETRAD-X was prepared and 0.02 parts by weight of an acrylic wetting agent, manufactured by Big.Chemi Co., BYK381 was added thereto and stirring was sufficiently performed, whereby a coating solution was prepared. The coating solution thus obtained was coated on a stretched polypropylene film of thickness 20 μm, manufactured by Toyobo k.k., in Japan, Pylene with bar coder No.6 and curing was performed at 60° C. for one hour, whereby a coated film was obtained. The thickness of the gas barrier layer was about 3 μm. Gas barrier property and interlayer adhesiveness of the coated film thus obtained were evaluated. The evaluation results were shown in Table 3.

EXAMPLE 9

The coated film was prepared and evaluated in the same manner as in Example 8 except that 66 parts by weight of amine curing agent H was used instead of amine curing agent G. The evaluation results were shown in Table 3.

EXAMPLE 10

The coated film was prepared and evaluated in the same manner as in Example 8 except that 70 parts by weight of an amine curing agent, manufactured by Mitsubishi Gas Chemical Co., Inc., in Japan, Gaskamine 340, composed of a reaction product of metaxylylenediamine and methyl methacrylate in molar ratio about 2/1 of metaxylylenediamine to methyl methacrylate was used instead of amine curing agent G. The evaluation results were shown in Table 3.

EXAMPLE 11

The coated film was prepared and evaluated in the same manner as in Example 8 except that 100 parts by weight of amine curing agent I was used instead of amine curing agent G. The evaluation results were shown in Table 3.

EXAMPLE 12

The coated film was prepared prepared and evaluated in the same manner as in Example 8 except that 144 parts by weight of amine curing agent J was used instead of amine curing agent G. The evaluation results were shown in Table 3.

EXAMPLE 13

The coated film was prepared and evaluated in the same manner as in Example 8 except that 50 parts by weight of an epoxy resin with diglycidylether moiety derived from bisphenol F, manufactured by Yuka Shell Epoxy k,.k., in Japan, Epicoat 807 instead of the epoxy resin with tetraglycidylamine derived from metaxylylenediamine and 77 parts by weight of amine curing agent G were used. The evaluation results were shown in Table 3.

COMPARATIVE EXAMPLE 3

The coated film was prepared and evaluated in the same manner as in Example 8 expect that 50 parts by weight of an epoxy resin with diglycidylether moiety derived from bisphenol A, manufactured by Yuka Shell Epoxy k.k., in Japan, Epicoat 828 instead of the epoxy resin with tetraglycidylamine derived from metaxylylenediamine and 27 parts by weight of amine curing agent K were used instead of amine curing agent G. The evaluation results were shown in Table 3.

COMPARATIVE EXAMPLE 4

A PVDC coated stretched polypropylene (KOPP) film of thickness about 20 μm, manufactured by Daicel Kagaku k.k., in Japan, Seneshi KOP #1000 was evaluated in the same manner as in Example 8. The evaluation results were shown in Table 3.

EXAMPLE 14

Oxygen permeability under a high humidity of relative humidities 80% and 90%, impact resistance and Oxygen permeability after retort treatment of the coated film prepared in Example 8 were evaluated. The evaluation results were shown in Table 4.

COMPARATIVE EXAMPLE 5

The coated film of Comparative Example 4 was evaluated in the same manner as in Example 14. The evaluation results were shown in Table 4.

COMPARATIVE EXAMPLE 6

A PVA coated OPP of thickness about 20 μm, Rengo k.k., in Japan, Renbarrier R1 was evaluated in the same manner as in Example 14. The evaluation results were shown in Table 4.

EXAMPLE 15

A methanol/ethyl acetate=1/1 solution (solid matter concentration; 30% by weight) containing 90 parts by weight of amine curing agent G and 50 parts by weight of an epoxy resin with tetraglycidylamine derived from metaxylylenediamine, manufactured by Mitsubishi Gas Chemical Co., Inc., TETRAD-X was prepared and 0.02 parts by weight of an acrylic wetting agent, manufactured by Big.Chemi Co., BYK281 was added thereto and stirring was sufficiently performed, whereby a coating solution was prepared. The coating solution thus obtained was coated (coating amount: 3 g/m2 (solid matter)) on a stretched polypropylene film of thickness 20 μm, manufactured by Toyobo k.k., in Japan, Pylene with bar coder No.3 and dried at 80° C. for 30 seconds and then adhered to a linear low density polyethylene film of thickness of 40 μm, manufactured by Toyobo k.k., Ricks with a nip roller and aging was performed at 35° C. for one day, whereby a laminate was obtained. Gas barrier property and interlayer adhesiveness of the laminate thus obtained were evaluated. The evaluation results were shown in Table 5.

The oxygen permeation factor of the gas barrier layer was 0.020 cc-mm/m$^2$·day·atm.

EXAMPLE 16

The laminate was prepared and evaluated in the same manner as in Example 15 except that 66 parts by weight of amine curing agent H was used instead of amine curing agent G. The evaluation results were shown in Table 5.

The oxygen permeation factor of the gas barrier layer was 0.028 cc-mm/m$^2$·day·atm.

EXAMPLE 17

The laminate was prepared and evaluated in the same manner as in Example 15 except that 100 parts by weight of amine curing agent I was used instead of amine curing agent G. The evaluation results were shown in Table 5.

The oxygen permeation factor of the gas barrier layer was 0.015 cc-mm/m$^2$·day·atm.

EXAMPLE 18

The laminate was prepared and evaluated in the same manner as in Example 15 except that 70 parts by weight of an amine curing agent, manufactured by Mitsubishi Gas Chemical Co., Inc., in Japan, Gaskamine 340, composed of a reaction product of metaxylylenediamine and methyl methacrylate in molar ratio about 2/1 of metaxylylenediamine to methyl methacrylate was used instead of amine curing agent G. The evaluation results were shown in Table 5.

The oxygen permeation factor of the gas barrier layer was 0.040 cc-mm/m$^2$·day·atm.

EXAMPLE 19

The laminate was prepared and evaluated in the same manner as in Example 15 except that a stretched polypropylene film of thickness 40 μm, manufactured by Toyobo k.k., in Japan, Pylene was used instead of the linear low density polyethylene film of thickness 40 μm, manufactured by Toyobo k.k., Ricks. The evaluation results were shown in Table 5.

COMPARATIVE EXAMPLE 7

The laminate was prepared and evaluated in the same manner as in Example 15 except that a polyurethane adhesive coating solution composed of an ethyl acetate solution (solid matter concentration; 30% by weight) containing 50 parts by weight of a polyether component, manufactured by Toyo Morton k.k., in Japan, TM-329 and 50 parts by weight of a polyisocyanate component, manufactured by Toyo Morton k.k., in Japan, CAT-8B was prepared and used instead of the coating solution of Example 15. The evaluation results were shown in Table 5.

COMPARATIVE EXAMPLE 8

The laminate was prepared and evaluated in the same manner as in Example 15 except that 50 parts by weight of an epoxy resin with diglycidylether moiety derived from bisphenol A, manufactured by Yuka Shell Epoxy k.k., in Japan, Epicoat 828 instead of the epoxy resin tetraglycidyl moiety derived from metaxylylenediamine and 27 parts by weight of amine curing agent J was used instead of amine curing agent G. The evaluation results were shown in Table 5.

EXAMPLE 20

Oxygen permeability under a high humidity of relative humidities 80% and 90%, impact resistance and oxygen permeability after retort treatment, appearance, appearance after retort treatment and heat seal strength of the laminate prepared in Example 19 were evaluated. The evaluation results were shown in Table 6.

In the composition for coating having a gas barrier property of the present invention, a high gas barrier property can be developed in a standard blending range where epoxy resin products are prepared by reaction of an epoxy resin and an amine curing agent because a high proportion of amide group having a high cohesive force is contained in the composition. Thus, a curing coated film with a high gas barrier property in addition to inherent excellent performances of an epoxy resin can be obtained by use of the composition for coating having a gas barrier property of the present invention.

The coated film having a gas barrier property of the present invention is applicable to various uses including packaging materials for food and medicine in which a high gas barrier property is required since various performances such as interlayer adhesiveness, a gas barrier property under a high humidity, impact resistance and retort treatment resistance in addition to a high barrier property are excellent.

Further, the multilayered laminate of the present invention is applicable to various uses as a non-halogen gas barrier material since various performances such as transparency, impact resistance, retort treatment resistance and a heat seal property in addition to a high gas barrier property are excellent and its interlayer adhesiveness is about the same as that in the case where conventional polyurethane adhesive is used.

TABLE 1

| | Oxygen permeation factor (cc-mm/m$^2 \cdot$ day $\cdot$ atm) | Water vapor permeation factor (g-mm/m$^2 \cdot$ day) |
|---|---|---|
| Example 1 | 0.028 | 0.6 |
| Example 2 | 0.020 | 0.6 |
| Example 3 | 0.034 | 0.7 |
| Example 4 | 0.040 | 0.6 |
| Example 5 | 0.088 | 0.6 |
| Example 6 | 0.025 | 0.5 |
| Example 7 | 0.015 | 0.6 |
| Comp. Ex. 1 | 0.016 | 0.9 |
| Comp. Ex. 2 | 3.7 | 0.3 |

TABLE 2

| | Distilled water | Salt water spraying | Methanol | Toluene |
|---|---|---|---|---|
| Example 1 | Ex | Ex | Ex | Ex |
| Example 2 | Ex | Ex | G | Ex |
| Example 3 | G | Ex | P | Ex |
| Example 4 | Ex | Ex | Ex | Ex |
| Example 5 | Ex | Ex | Ex | Ex |
| Comp. Ex. 1 | P | P | P | Ex |
| Comp. Ex. 2 | Ex | Ex | Ex | Ex |

TABLE 3

| | Oxygen permeability (cc/m$^2 \cdot$ day $\cdot$ atm) | Water vapor permeability (g/m$^2 \cdot$ day) | Interlayer adhesiveness (g/15 mm) f: breakage of OPP film |
|---|---|---|---|
| Example 8 | 7 | 7 | 250f |
| Example 9 | 9 | 7 | 250f |
| Example 10 | 13 | 7 | 250f |
| Example 11 | 5 | 7 | 250f |
| Example 12 | 8 | 7 | 250f |
| Example 13 | 20 | 7 | 250f |
| Comp. Ex. 3 | 103 | 7 | 80 |
| Comp. Ex. 4 | 7 | 5 | ✕ |

Note: ✕ It was impossible to measure.

TABLE 4

| | Oxygen permeability (cc/m$^2 \cdot$ day $\cdot$ atm) | | | | |
|---|---|---|---|---|---|
| | 60% RH | 80% RH | 90% RH | After Gerbo treatment | After retort treatment |
| Example 14 | 7 | 13 | 32 | 32 | 11 |
| Comp. Ex. 5 | 7 | 7 | 10 | 170 | 11 |
| Comp. Ex. 6 | 1 | 120 | >1000 | — | — |

TABLE 5

| | Oxygen permeability (cc/m$^2 \cdot$ day $\cdot$ atm) | Water vapor permeability (g/m$^2 \cdot$ day) | Interlayer adhesiveness (g/15 mm) f: breakage of OPP film |
|---|---|---|---|
| Example 15 | 7 | 4.4 | 250f |
| Example 16 | 10 | 4.4 | 250f |
| Example 17 | 5 | 4.4 | 250f |
| Example 18 | 14 | 4.4 | 250f |
| Example 19 | 7 | 3.0 | 300f |
| Comp. Ex. 7 | >1000 | 4.5 | 250f |
| Comp. Ex. 8 | 117 | 4.4 | 80 |

TABLE 6

| | | Example 20 |
|---|---|---|
| Oxygen permeability 60% RH | (cc/m$^2 \cdot$ day $\cdot$ atm) | 7 |
| Oxygen permeability 80% RH | (cc/m$^2 \cdot$ day $\cdot$ atm) | 10 |
| Oxygen permeability 90% RH | (cc/m$^2 \cdot$ day $\cdot$ atm) | 20 |
| Oxygen permeability after Gerbo treatment | (cc/m$^2 \cdot$ day $\cdot$ atm) | 10 |
| Oxygen permeability after retort treatment | (cc/m$^2 \cdot$ day $\cdot$ atm) | 11 |

TABLE 6-continued

| | | Example 20 |
|---|---|---|
| Appearance | | transparent |
| Appearance after retort treatment | | transparent |
| Heat seal strength | (kg/15 mm) | 1.7 |

What is claimed is:

1. A composition for coating having a gas barrier property comprising coating-forming components of an epoxy resin and an amine curing agent, wherein said epoxy resin is an epoxy resin with glycidylamine moiety derived from metaxylylendiamine and said amine curing agent is a reaction product obtained from reactants consisting essentially of the following (A), (B) and (C):

(A) metaxylylenediamine or paraxylylenediamine;
(B) polyfunctional compound of acrylic acid, methacrylic acid and/or derivative thereof, fumaric acid, maleic acid, malic acid, tartaric acid, isophthalic acid, terephthalic acid, pyromellitic acid, trimellitic acid or derivatives thereof, having at least one acyl group which is capable of forming amide group moiety by reaction with a polyamine to form an oligomer;
(C) formic acid, acetic acid, propionic acid, butyric acid, lactic acid, glycolic acid, benzoic acid and/or derivative thereof.

2. The composition for coating according to claim 1, wherein said (B) polyfunctional compound is acrylic acid, methacrylic acid and/or derivative thereof.

3. A coating comprising the composition for coating having a gas barrier property described in claim 1.

4. A coated film having a gas barrier property comprising a gas barrier layer coated on at least one side of a flexible polymer film, wherein said gas barrier layer is a layer formed by cure of a composition for coating having a gas barrier property comprising coating-forming components of an epoxy resin and an amine curing agent, wherein said amine curing agent is a reaction product of the following (A), (B) and (C):

(A) metaxylylenediamine or paraxylylenediamine;
(B) polyfunctional compound having at least one acyl group which is capable of forming amide group moiety by reaction with a polyamine to form an oligomer;
(C) formic acid, acetic acid, propionic acid, butyric acid, lactic acid, glycolic acid, benzoic acid and/or derivative thereof.

5. The coated film according to claim 4, wherein said epoxy resin is an epoxy resin with glycidylamine moiety derived from metaxylylenediamine.

6. The coated film according to claim 4, wherein said (B) polyfunctional compound is acrylic acid moiety derived from metaxylylenediamine.

7. The coated film according to claim 4, wherein said flexible polymer film is polyolefin film, a polyester film or a polyamide film.

8. A multilayered laminate having a gas barrier property comprising two outer layers ($S_1$) and ($S_2$) and at least one intermediate layer comprising at least one gas barrier layer (G) interposed between said two outer layers ($S_1$) and ($S_2$), wherein said gas barrier layer (G) is a layer formed by cure of a composition for coating having a gas barrier property comprising coating-forming components of an epoxy resin and an amine curing agent, wherein said amine curing agent is a reaction product of the following (A), (B) and (C):

(A) metaxylylenediamine or paraxylylenediamine;
(B) polyfunctional compound having at least one acyl group which is capable of forming amide group moiety by reaction with a polyamine to form an oligomer;
(C) formic acid, acetic acid, propionic acid, butyric acid, lactic acid, glycolic acid, benzoic acid and/or derivative thereof.

9. The multilayered laminated according to claim 8, wherein said epoxy resin is an epoxy resin with glycidylamine moiety derived from metaxylylenediamine.

10. The multilayered laminate according to claim 8, wherein said (B) polyfunctional compound is acrylic acid, methacrylic acid and/or derivative thereof.

11. The multilayered laminate according to claim 8, wherein each said outer layers ($S_1$) and ($S_2$) is flexible polymer film layer (F).

12. The multilayered laminate according to claim 11, wherein said flexible polymer film layer (F) is one film layer selected from the group consisting of a polyolefin film, a polyester film and a polyamide film.

13. The multilayered laminate according to claim 11, having flexible polymer film layer (F)-gas barrier layer (G)-flexible polymer film layer (F), flexible polymer film layer (F)-gas barrier layer (G)-paper layer (P)-gas barrier layer (G)-flexible polymer film layer (F), flexible polymer film layer (F)-gas barrier layer (G)-paper layer (P)-gas barrier layer (G)-metallic foil layer (M)-gas barrier layer (G)-flexible polymer film layer (F) or flexible polymer film layer (F)-gas barrier layer (G)-flexible polymer film layer (F)-gas barrier layer (G)-flexible polymer film layer (F).

14. The multilayered laminate according to claim 8, wherein said outer layer ($S_1$) is flexible polymer film layer (F) and said outer layer ($S_2$) is paper layer (P) or metallic foil layer (M).

15. The multilayered laminate according to clam 14, having flexible polymer film layer (F)-gas barrier layer (G)-paper layer (P), flexible polymer film layer (F)-gas barrier layer (G)-metallic foil layer (M) or flexible polymer film layer (F)-gas barrier layer (G)-metallic foil layer (M)-gas barrier layer (G)-paper layer (P).

16. The multilayered laminate according to claim 8, wherein said outer layer ($S_1$) is paper layer (F) or metallic foil layer (M) and said outer layer ($S_2$) is paper layer (P) or metallic foil layer (M).

17. The multilayered laminate according to claim 16, having paper layer (P)-gas barrier layer (G)-metallic foil layer (M)-paper layer (P)-gas barrier layer (G)-paper layer (P), metallic foil layer (M)-gas barrier layer (G)-metallic foil layer (M), paper layer (P)-gas barrier layer (G)-flexible polymer film layer (F)-gas barrier layer (G)-metallic foil layer (M), paper layer (P)-gas barrier layer (G)-flexible polymer film layer (F)-gas barrier layer (G)-paper layer (P) or metallic foil layer (M)-gas barrier layer (G)-flexible polymer film layer (F)-gas barrier layer (G)-metallic foil layer (M).

18. The multilayered laminate according to claim 8, wherein said gas barrier layer (G) has an oxygen permeation factor of 0.2 cc-mm/$m_2$·day·atom or below under the conditions of temperature 23° C. and relative humidity 60%.

19. A coated film having a gas barrier property comprising a gas barrier layer coated on at least one side of a flexible polymer film, wherein said gas barrier layer is a layer formed by cure of a composition for coating having a gas barrier property consisting essentially of coating-forming components of an epoxy resin and an amine curing agent, wherein said epoxy resin is an epoxy resin with glycidylamine moiety derived from metaxylylenediamine and said amine curing agent consists of a reaction product obtained from reactants consisting of the following (A) and (B) in a molar ratio [(B)/(A)] of 0.3:1 to 0.95:1;

(A) metaxylylenediamine or paraxylylenediamine;
(B) polyfunctional compound of acrylic acid, methacrylic acid and/or derivative thereof, fumaric acid, malic acid, tartaric acid, pyromellitic acid, trimellitic acid or derivatives thereof, having at least one acyl group which is capable of forming amide group moiety by reaction with a polyamine to form an oligomer.

20. The coated film according to claim 19, wherein said (B) polyfunctional compound is acrylic acid, methacrylic acid and/or derivative thereof.

21. The coated film according to claim 19, wherein said flexible polymer is a polyolefin film, a polyester film or a polyamide film.

22. A coated film having a gas barrier property comprising a gas barrier layer coated on at least one side of a flexible polymer film, wherein said gas barrier layer is a layer formed by cure of a composition for coating having a gas barrier property consisting essentially of coating-forming components of an epoxy resin and an amine curing agent, wherein said epoxy resin is an epoxy resin with glycidylamine moiety derived from metaxylylenediamine and said amine curing agent consists of a reaction product obtained from a mixture consisting of reactants consisting of the following (A) and (B) in a molar ratio [(B)/(A)] of 0.3:1 to 0.95:1 and a non-reactive solvent, a catalyst and/or a tertiary amine selected from the group consisting of pyridine, picoline, lutidine and trialkylamine;

(A) metaxylylenediamine or paraxylylenediamine;
(B) polyfunctional compound of acrylic acid, methacrylic acid and/or derivative thereof, fumaric acid, malic acid, tartaric acid, pyromellitic acid, trimellitic acid or derivatives thereof, having at least one acyl group which is capable of forming amide group moiety by reaction with a polyamine to form an oligomer.

23. The coated film according to claim 22, wherein said (B) polyfunctional compound is acrylic acid, methacrylic acid and/or derivative thereof.

24. The coated film according to claim 22, wherein said flexible polymer is a polyolefin film, a polyester film or a polyamide film.

25. A mutilayered laminate having a gas barrier property comprising two outer layer ($S_1$) and ($S_2$) and at least one intermediate layer comprising at least one gas barrier layer (G) interposed between said two outer layers ($S_1$) and ($S_2$), wherein said gas barrier layer (G) is a layer formed by cure of a composition for coating having a gas barrier property consisting essentially of coating-forming components of an epoxy resin and an amine curing agent, wherein said epoxy resin is an epoxy resin with glycidylamine moiety derived from metaxylylendiamine and said amine curing agent consists of a reaction product obtained from reactants consisting of the following (A) and (B) in a molar ratio [(B)/(A)] of 0.3:1 to 0.95:1;

(A) metaxylylenediamine or paraxylylenediamine;
(B) polyfunctional compound of acrylic acid, methacrylic acid and/or derivative thereof, fumaric acid, malic acid, tartaric acid, pyromellitic acid, trimellitic acid or derivatives thereof, having at least one acyl group which is capable of forming amide group moiety by reaction with a polyamine to form an oligomer.

26. The multilayered laminate according to claim 25, wherein said (B) polyfunctional compound is acrylic acid, methacrylic acid and/or derivative thereof.

27. The multilayered laminate according to claim 25, wherein each said outer layers ($S_1$) and ($S_2$) is flexible polymer film layer (F).

28. The multilayered laminate according to claim 27, wherein said flexible polymer film layer (F) is one film layer selected from the group consisting of a polyolefin film, a polyester film and a polyamide film.

29. The multilayered laminate according to claim 27, having flexible polymer film layer (F)-gas barrier layer (G)-flexible polymer film layer (F), flexible polymer film layer (F)-gas barrier layer (G)-paper layer (P)-gas barrier layer (G)-flexible polymer film layer (F), flexible polymer film layer (F)-gas barrier layer (G)-paper layer (P)-gas barrier layer (G)-metallic foil layer (M)-gas barrier layer (G)-flexible polymer film layer (F) or flexible polymer film layer (F)-gas barrier layer (G)-flexible polymer film layer (F)-gas barrier layer (G)-flexible polymer film layer (F).

30. The multilayered laminate according to claim 25, wherein said outer layer ($S_1$) is flexible polymer film layer (F) and said outer layer ($S_2$) is paper layer (P) or metallic foil layer (M).

31. The multilayered laminate according to claim 30, having flexible polymer film layer (F)-gas barrier layer (G)-paper layer (P), flexible polymer film layer (F)-gas barrier layer (G)-metallic foil layer (M) or flexible polymer film layer (F)-gas barrier layer (G)-metallic foil layer (M)-gas barrier layer (G)-paper layer (P).

32. The multilayered laminate according to claim 25, wherein said outer layer ($S_1$) is paper layer (P) or metallic foil layer (M) and said outer layer ($S_2$) is paper layer (P) or metallic foil layer (M).

33. The multilayered laminate according to claim 32, having paper layer (P)-gas barrier layer (G)-metallic foil layer (M), paper layer (P)-gas barrier layer (G)-paper layer (P), metallic foil layer(M)-gas barrier layer (G)-metallic foil layer (M), paper layer (P)-gas barrier layer (G)-flexible polymer film layer (F)-gas barrier layer (G)-metallic foil layer (M), paper layer (P)-gas barrier layer (G)-flexible polymer film layer (F)-gas barrier layer (G)-paper layer (P) or metallic foil layer (M)-gas barrier layer (G)-flexible polymer film layer (F)-gas barrier layer (G)-metallic foil layer (M).

34. The multilayered laminate according to claim 25, wherein said gas barrier layer (G) has an oxygen permeation factor of 0.2 cc·mm/m$^2$·day·atm or below under the conditions of temperature 23° C. and relative humidity 60%.

35. A multilayered laminate having a gas barrier property comprising two outer layers ($S_1$) and ($S_2$) and at least one intermediate layer comprising at least one gas barrier layer (G) interposed between said two outer layers ($S_1$) and ($S_2$), wherein said gas barrier layer (G) is a layer formed by cure of a composition for coating having a gas barrier property consisting essentially of coating-forming components of an epoxy resin and an amine curing agent, wherein said epoxy resin is an epoxy resin with glycidylamine moiety derived from metaxylylendiamine and said amine curing agent consists of a reaction product obtained from a mixture consisting of reactants consisting of the following (A) and (B) in a molar ratio [(B)/(A)] of 0.3:1 to 0.95:1 and a non-reactive solvent, a catalyst and/or a tertiary amine selected from the group consisting of pyridine, picoline, lutidine and trialkylamine;

(A) metaxylylenediamine or paraxylylenediamine;
(B) polyfunctional compound of acrylic acid, methacrylic acid and/or derivative thereof, fumaric acid, malic acid, tartaric acid, pyromellitic acid, trimellitic acid or derivatives thereof, having at least one acyl group which is capable of forming amide group moiety by reaction with a polyamine to form an oligomer.

36. The multilayered laminate according to claim 35, wherein said (B) polyfuntional compound is acrylic acid, methacrylic acid and/or derivative thereof.

37. The multilayered laminate according to claim 35, wherein each said outer layers ($S_1$) and ($S_2$) is flexible polymer film layer (F).

38. The multilayered laminate according to claim 37, wherein said flexible polymer film layer (F) is one film layer selected from the group consisting of a polyolefin film, a polyester film and a polyamide film.

39. The multilayered laminate according to claim 37, having flexible polymer film layer (F)-gas barrier layer (G)-flexible polymer film layer (F), flexible polymer film layer (F)-gas barrier layer (G)-paper layer (P)-gas barrier layer (G)-flexible polymer film layer (F), flexible polymer film layer (F)-gas barrier layer (G)-paper layer (P)-gas barrier layer (G)-metallic foil layer (M)-gas barrier layer (G)-flexible polymer film layer (F) or flexible polymer film layer (F)-gas barrier layer (G)-flexible polymer film layer (F)-gas barrier layer (G)-flexible polymer film layer (F).

40. The multilayered laminate according to claim 35, wherein said outer layer ($S_1$) is flexible polymer film layer (F) and said outer layer ($S_2$) is paper layer (P) or metallic foil layer (M).

41. The multilayered laminate according to claim 40, having flexible polymer film layer (F)-gas barrier layer (G)-paper layer (P), flexible polymer film layer (F)-gas barrier layer (G)-metallic foil layer (M) or flexible polymer film layer (F)-gas barrier layer (G)-metallic foil layer (M)-gas barrier layer (G)-paper layer (P).

42. The multilayered laminate according to claim 35, wherein said outer layer ($S_1$) is paper layer (P) or metallic foil layer (M) and said outer layer ($S_2$) is paper layer (P) or metallic foil layer (M).

43. The multilayered laminate according to claim 42, having paper layer (P)-gas barrier layer (G)-metallic foil layer (M), paper layer (P)-gas barrier layer (G)-paper layer (P), metallic foil layer (M)-gas barrier layer (G)-metallic foil layer (M), paper layer (P)-gas barrier layer (G)-flexible polymer film layer (F)-gas barrier layer (G)-metallic foil layer (M), paper layer (P)-gas barrier layer (G)-flexible polymer film layer (F)-gas barrier layer (G)-paper layer (P) or metallic foil layer (M)-gas barrier layer (G)-flexible polymer film layer (F)-gas barrier layer (G)-metallic foil layer (M).

44. The multilayered laminate according to claim 35, wherein said gas barrier layer (G) has an oxygen permeation factor of 0.2 cc·mm/m²·day·atm or below under the conditions of temperature 23° C. and relative humidity 60%.

* * * * *